US009076022B2

(12) United States Patent
Guenther

(10) Patent No.: US 9,076,022 B2
(45) Date of Patent: Jul. 7, 2015

(54) METHOD AND DEVICE FOR SENSING AND RESPONDING TO AN UNAUTHORIZED OPENING OF A BIOMETRIC TRAIT CAPTURE DEVICE

(71) Applicant: StepOver GmbH, Stuttgart (DE)

(72) Inventor: Andreas Guenther, Ostfildern (DE)

(73) Assignee: StepOver GmbH, Stuttgart (DE)

(*) Notice: Subject to any disclaimer, the term of this patent is extended or adjusted under 35 U.S.C. 154(b) by 207 days.

(21) Appl. No.: 13/661,627

(22) Filed: Oct. 26, 2012

(65) Prior Publication Data

US 2013/0111600 A1     May 2, 2013

(30) Foreign Application Priority Data

Oct. 28, 2011 (DE) .......................... 10 2011 117 214

(51) Int. Cl.
    *H04L 29/06*         (2006.01)
    *G06F 21/86*         (2013.01)
    *G06F 21/72*         (2013.01)
    *G06F 21/30*         (2013.01)
    *G06F 21/32*         (2013.01)
    *H04W 28/02*        (2009.01)

(52) U.S. Cl.
    CPC ............ *G06F 21/86* (2013.01); *H04L 63/0861* (2013.01); *G06F 21/30* (2013.01); *G06F 21/32* (2013.01); *H04W 28/0221* (2013.01); *G06F 21/72* (2013.01); *G06F 2221/2143* (2013.01)

(58) Field of Classification Search
    CPC ......... G06F 21/32; G06F 1/30; H04L 9/0866; H04L 63/0861; H04W 28/0221
    USPC ............... 726/26; 705/75; 713/186; 324/681; 365/218
See application file for complete search history.

(56) References Cited

U.S. PATENT DOCUMENTS

| 4,593,384 | A | * | 6/1986 | Kleijne ......................... 365/228 |
|---|---|---|---|---|
| 5,195,133 | A | | 3/1993 | Kapp et al. |
| 5,208,858 | A | | 5/1993 | Vollert et al. |
| 5,297,202 | A | | 3/1994 | Kapp et al. |
| 5,912,621 | A | | 6/1999 | Schmidt |
| 7,024,562 | B1 | | 4/2006 | Flink et al. |
| 2008/0010218 | A1 | | 1/2008 | Zank |
| 2009/0210637 | A1 | * | 8/2009 | Yung et al. .................... 711/154 |
| 2010/0106973 | A1 | | 4/2010 | Guenther |
| 2011/0031985 | A1 | | 2/2011 | Johnson |

(Continued)

FOREIGN PATENT DOCUMENTS

| DE | 10112177 | | 9/2002 |
|---|---|---|---|
| EP | 2437531 | A1 * | 4/2012 |

(Continued)

*Primary Examiner* — Harunur Rashid
*Assistant Examiner* — Angela Holmes
(74) *Attorney, Agent, or Firm* — J-Tek Law PLLC; Jeffrey D. Tekanic; Scott T. Wakeman

(57) ABSTRACT

A biometric trait capture device includes a biometric trait capture sensor contained in a housing and configured to capture biometric data, such as a handwritten signature or other biometric trait(s) of a signor, in digitized form. A memory is provided in the housing and is not electronically accessible from outside of the housing. A value, such as an encryption key, is stored in the memory. A memory-erasure device erases or overwrites the value in response to an opening of the housing, thereby providing information indicating that the biometric trait capture device has possibly been tampered with by an unauthorized person.

4 Claims, 2 Drawing Sheets

(56) References Cited

U.S. PATENT DOCUMENTS

2011/0179289 A1 7/2011 Guenther
2011/0185184 A1 7/2011 Guenther
2011/0231666 A1 9/2011 Guenther

FOREIGN PATENT DOCUMENTS

| WO | 00/07330 | 2/2000 |
| WO | 01/08352 | 2/2001 |
| WO | 01/63994 | 8/2001 |

* cited by examiner

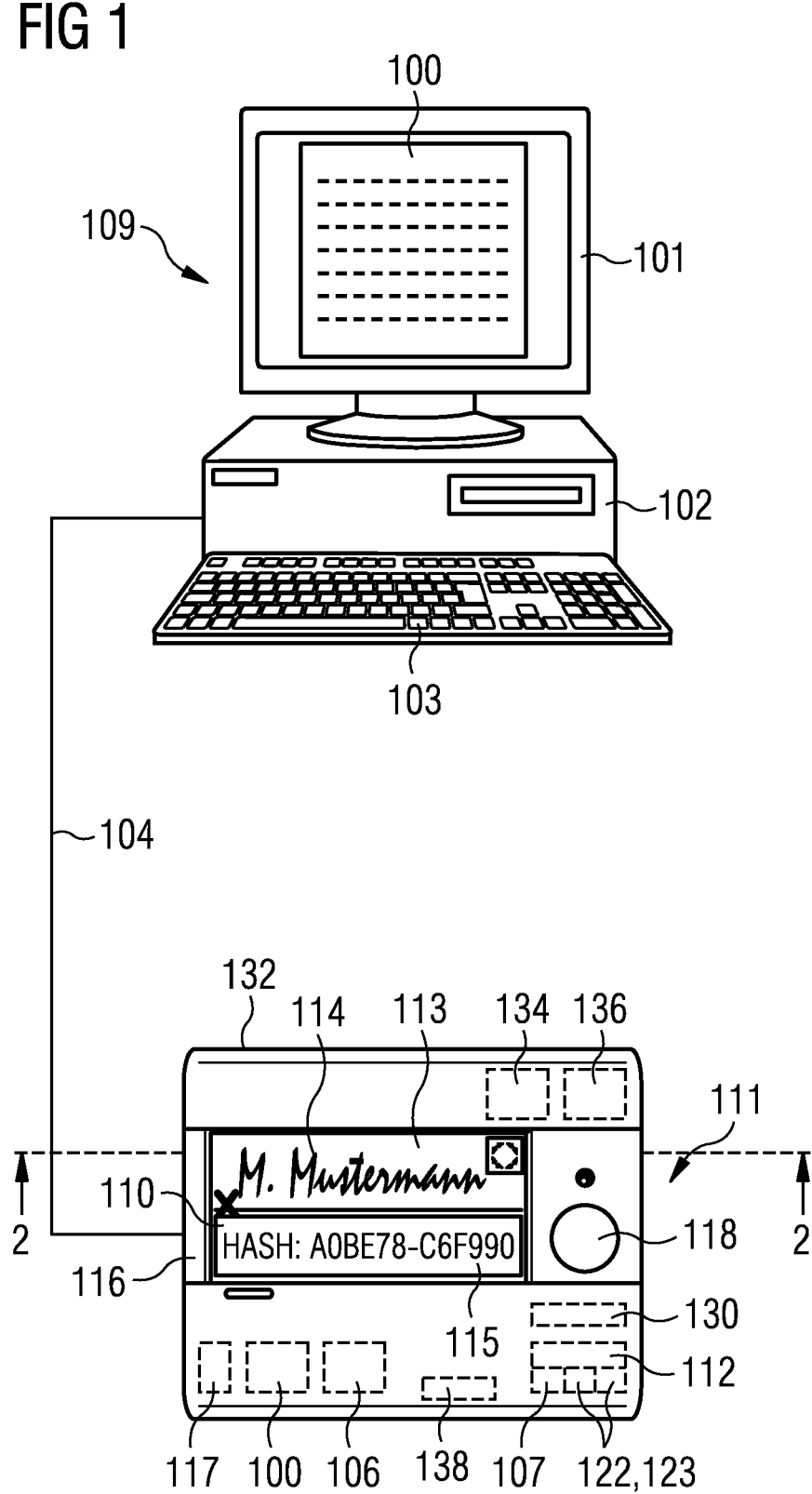

METHOD AND DEVICE FOR SENSING AND RESPONDING TO AN UNAUTHORIZED OPENING OF A BIOMETRIC TRAIT CAPTURE DEVICE

CROSS-REFERENCE

This application claims priority to German patent application no. 10 2011 117 214.2 filed on Oct. 28, 2011, the contents of which are fully incorporated herein by reference.

TECHNICAL FIELD

In certain aspects, the present invention generally relates to methods and devices for capturing and optionally encrypting at least one biometric trait for use as an electronic signature, e.g., in order to secure electronic data such as an e-document. In preferred embodiments, methods and biometric trait capture devices capable of detecting and responding to an unauthorized opening of a biometric trait capture device are disclosed, in which a value stored in a memory of the biometric trait capture device is erased or overwritten upon opening a housing of the biometric trait capture device, thereby providing, e.g., a simple and effective way to prevent subsequent usage of the biometric trait capture device after it has been tampered with.

In other aspects, the present invention further generally relates to computer systems for capturing, encrypting and/or using an electronic signature and may comprise a data processing device and a biometric trait capture device that are capable of bi-directional data communication with each other. In such embodiments, the biometric trait capture device is preferably spatially separated from the data processing device and is configured as a separate unit.

DEFINITIONS

As an initial matter, it is noted that a device for capturing, acquiring or detecting at least one biometric trait may be generally referred to as a 'biometric trait capture device', 'signature device' or 'signature capture device' in the following description and these terms are intended to be generally interchangeable. It is noted that a handwritten signature is one type of biometric trait that may be utilized to uniquely identify a natural person and preferred embodiments relate to methods and devices capable of capturing (e.g., recording and storing in a digitized manner) a handwritten signature, but the present teachings are not limited to devices that are capable of capturing a handwritten signature. Other types of biometric traits, such as a fingerprint, palm print, iris image, facial image, voice sample, etc., also may be captured (i.e. in addition to or instead of a handwritten signature), encrypted and utilized to generate an electronic signature that uniquely identifies the signatory (signor) of an electronic dataset. Thus, devices according to the present teachings may, for example, comprise one or more technical or hardware devices, e.g., sensor(s), for capturing, acquiring or detecting at least one biometric trait of a natural person, such as a handwritten signature and/or other biometric information, who will electronically sign an electronic dataset (e.g., a document).

Electronic datasets in the sense of the present teachings may be any type of electronic document, for example, and not limited to, PDF files, Word files, XML files, or other files or data that can be processed in a database using known programs or software packages.

The terms "transmit" and "transmission" as used herein generally relate to any type of transfer, transmission, sending or conveyance of digitized information from one device to another device. In this respect, the transmission may be effected via an active transmission (e.g., via Bluetooth® or WLAN, e.g., WiFi®) and/or by storage and retrieval (e.g., Mass Storage Control Protocol 'MSCP' or network-attached storage 'NAS'). The protocol used in this case (e.g., TCP-IP, HID or proprietary) is as irrelevant as the resulting type of information distribution during transfer, e.g., breakdown into packets of a predetermined size (e.g., in HID or TCP-IP), or transfer as a whole, e.g., as a continuous data stream (as used in a serial interface, mass-storage devices or possibly even proprietary protocols). The transmission medium (e.g., cable, radio waves, infrared, optical fibers, etc.) is also unaffected by this definition.

The term "display" or "display area" as used herein basically refers to any kind of technical or hardware device for two- or three-dimensionally displaying electronic data, e.g., an LCD display, TFT display, e-paper display, OLED display, a projection screen, etc. More particularly, any type of known graphical, single-colored or multi-colored visualization device should be understood as falling within the scope of "display" and "display area".

According to the present teachings, biometric traits may be captured, acquired or detected by any suitable device, e.g., a camera configured to scan or capture, for example, the iris, a fingerprint, a palm print, a face, etc. Other suitable technical or hardware devices may include: capacitive or resistive touch sensors, load cells or an active pen with position-determining devices (for example, a commercially-available graphic tablet or tablet PC with a stylus) designed to capture, acquire or detect the biometric data of a signature, a microphone for capturing or recording a voice sample, etc., preferably in a digitized form capable of being stored in digital memory. In particular, capacitive and resistive touch sensors using a stylus are well known from the touch screen field, as well as devices that digitally capture signatures, e.g., for in-store credit card purchases. All such devices may be advantageously utilized with the present teachings.

Further, a biometric trait capture device according to the present teachings may also comprise suitable signal processing devices (e.g., chips, processors, memories, etc.), e.g., for carrying out encryption operations. Encrypted electronic biometric data are generated based upon the captured biometric traits. Such encrypted biometric data may include, for example, a digitized signature, preferably comprising an image or the coordinates of the signature and, when appropriate, the pressure and/or time elapsed (e.g. signing rhythm) of the signature. In addition or in the alternative, such encrypted biometric data may comprise one or more of a digitized iris scan, digitized facial scan, digitized hand geometry data (e.g. palm print), digitized fingerprint or fingerprints, digitized voice sample, etc.

BACKGROUND

In recent years, many laws and regulations regarding electronic signature of electronic datasets, so-called "electronic signatures", have been passed. A subset of electronic signatures is 'digital signatures', in which, for example, an asymmetric key pair consisting of a secret private key and an associated public key is used (see, for example, known asymmetric encryption methods such as PGP and RSA).

The use of biometric traits or electronic biometric data based thereon can be one measure or means for providing or executing an electronic signature of electronic datasets. These biometric data can be linked to the signatory (signor) as a component of the electronic signature. Such biometric data thus serve(s) as an identifying trait or traits of the signatory.

A signature device such as a signature pad is often used for the capture and/or collection of the biometric data. The signature pad captures or collects the biometric data of a user, and signatures corresponding thereto can be created. In case a signature pad is intended for multiple users and will be used e.g. in a public place, it has been problematic with regard to the security of the method that such a signature pad could be temporarily unattended, and could be opened and tampered with while unattended. In certain circumstances the biometric traits or their corresponding electronic data could be intercepted or copied in this way, and thus possibly used improperly. Further, a unique key assigned to the signature pad could be read or tampered with.

SUMMARY

It is an object of the present teachings to provide options for overcoming one or more of the above-mentioned problems, and/or to provide an improved approach for overcoming one or more such problems, or even other problems not mentioned herein.

In a first aspect of the present teachings, a method for detecting an unauthorized opening of a biometric trait capture device is disclosed, and preferably concerns a biometric trait capture device that comprises a housing and a memory that cannot be accessed from outside the housing. A value is stored in the memory, such that the value is not accessible from outside the housing. According to the present teachings, the value stored in the memory is erased or overwritten with another value if the housing of the biometric trait capture device is opened.

The fact that the stored value is automatically erased or overwritten upon opening of the housing of the biometric trait capture device makes it possible that the biometric trait capture device itself can detect the unauthorized opening of the biometric trait capture device, for example by comparing the contents of the memory (which is not accessible from outside the housing) to a reference value which is permanently stored in the biometric trait capture device.

Furthermore, because the value is erased every time that the biometric trait capture device is opened, regardless of the reason for opening the biometric trait capture device, no possibility exists for an unauthorized user to prevent or otherwise manipulate or tamper with this erasure procedure. Consequently, the continued presence of the stored value in the memory can be used to convey information to the user that the biometric trait capture device has not been subjected to any tampering from the outside.

The value stored in the memory of the biometric trait capture device can be a unique key associated with the biometric trait capture device, which can be used for data encryption performed by the biometric trait capture device. In this case, further encryption and transmission of data by the biometric trait capture device may be automatically prevented if this key is erased, altered or overwritten.

Furthermore, if it determined that the value is no longer stored or has been altered, an error message can be displayed on the biometric trait capture device (i.e. on a display thereof, as exemplified in the preceding section) in order to indicate that the biometric trait capture device has been manipulated or tampered with. Subsequently, the key required for encryption can be re-written into the memory after appropriate inspection and service of the biometric trait capture device by the manufacturer or another authorized party.

In addition or in the alternative thereto, a security measure, step or protocol can be carried out if the memory no longer contains the previously-stored value. The security measure can comprise, for example, a silent alarm serving as a notification to a processor and/or operating software of the biometric trait capture device of the absence of the stored value, the receipt of which notification causes, for example, a security routine to be started. In the alternative or in additional thereto, further acquisition or creation of electronic signatures by the biometric trait capture device can be prevented, and/or a message can be displayed on the biometric trait capture device that indicates the biometric trait capture device has been opened, possibly in an unauthorized manner. In this way it can be ensured that an opening of the housing of the biometric trait capture device is sensed and registered in each case, and that further use of the biometric trait capture device, which has possibly been tampered with, can be prevented until the biometric trait capture device has been inspected and refurbished, if necessary. In addition, an operator or user responsible for the biometric trait capture device can be advised that an error or a possible security breach has occurred.

In preferred embodiments, the erasure of the value stored in the memory is effected automatically in the event that the housing of the biometric trait capture device is opened. For example, this erasure can be realized by providing an autonomous power supply in the biometric trait capture device, such as a battery, which powers at least one internal component of the biometric trait capture device. In this case, the power supply can be designed such that when the housing is opened, the current (power) to the component is interrupted, and as a consequence thereof the contents of the memory are erased.

In certain preferred embodiments, the erasure of the memory can occur automatically due to the type of memory used. For example, if the memory storing the value is volatile memory powered by the autonomous power supply, the contents of the volatile memory will be automatically erased if the power supply is interrupted or cut off. A suitable power supply circuit can be designed for the volatile memory such that when the housing is opened, the power supply to the memory is automatically interrupted.

In other preferred embodiments, a non-volatile memory may be provided in the biometric trait capture device for storing the value. In this case, another component of the biometric trait capture device, e.g., a control unit or processor(s) thereof, can be powered by the autonomous power supply. Upon an interruption of the power supply, the control unit or processor(s) determine(s) in a determination step that the power supply to this (other) component was interrupted due to an opening of the housing. In response thereto, the contents of the memory can be actively erased or overwritten with another value.

According to another embodiment of the present teachings, the memory may be erased upon an opening of the housing even if no autonomous power supply is present in the biometric trait capture device. For example, a non-volatile magnetic memory could be erased upon an opening of the housing by bringing a magnet contained in the housing into contact or proximity with the memory. In the alternative, upon sensing an opening of the housing, an electric pulse may be generated by an electromagnetic mechanism, which electric pulse erases or overwrites the contents of a non-volatile memory containing the stored value discussed above.

All of the above-mentioned alternatives have in common that the value stored in the memory of the biometric trait capture device, which may also be required as the key for the encryption of the electronic signature, is automatically erased upon an opening of the housing of the signature device, regardless of whether the biometric trait capture device is connected to external power and/or is switched on or not. If the biometric trait capture device is subsequently returned to operation, the operating software can then determine whether the value previously stored in the memory is still present. If not, the security measures described above can be performed.

In another aspect of the present teachings, the check of whether the (previously-stored) value of the biometric trait capture device is (still) present in the memory of the biometric trait capture device is carried out upon starting up the biometric trait capture device. In addition or in the alternative thereto, this check may be carried out at regular intervals during operation of the biometric trait capture device. In the latter case, it is possible to continuously monitor whether the housing of the biometric trait capture device has been opened during operation of the biometric trait capture device. Thus the security of the biometric trait capture device can also be continuously ensured during its operation.

According to a further exemplary aspect of the present teachings, a biometric trait capture device may comprise a housing having a capture apparatus, e.g., one or more sensors and/or cameras, built into (disposed in) the housing configured to capture, detect or acquire biometric data in digitized form. The biometric data can be, e.g., a handwritten signature of a user, or the electronic signature can be created or generated based on one or more other biometric traits of the user. The biometric trait capture device can further comprise a memory that is not accessible from outside the housing, in which a value is stored. Further, the biometric trait capture device can comprise a memory-erasure apparatus, which is configured to automatically erase or overwrite the value (e.g., a key) stored in the memory if the housing of the biometric trait capture device is opened.

In one preferred embodiment, the memory-erasure apparatus can be powered by an autonomous power supply, which is built into or disposed in the biometric trait capture device and powers at least one component of the biometric trait capture device. In addition, the memory-erasure apparatus preferably comprises an interruption apparatus which is configured to interrupt the flow of current (power) from the power supply to the at least one component if the housing is opened. For example, a mechanically-operated interruption apparatus, such as a pushbutton switch, can be installed in the housing of the biometric trait capture device, so that as long as the housing is closed the pushbutton remains pushed in and the switch is thus closed. However, as soon as the housing is opened, the pushbutton switch or another interruption apparatus is activated in such a way that the flow of current (power) from the power supply is interrupted, thereby ultimately causing the value in the memory to be erased, altered or overwritten with another value.

For example, the autonomous power supply can supply current (power) to a volatile memory of the biometric trait capture device. If the current (power) is interrupted by an opening of the housing, the contents of the volatile memory are lost. Consequently the value stored in the memory is erased.

In the alternative, the memory of the biometric trait capture device can be a non-volatile memory, which is actively erased or overwritten upon an opening of the housing. For this purpose for example, a separate memory-erasure apparatus can be provided in the form of a control unit or processor(s), which is (are) capable of detecting an interruption of current (power) from the power supply.

In other exemplary embodiments of the present teachings, the autonomous power supply can be omitted, for example if a magnetically-eraseable memory is used. In this case, upon an opening of the housing, the magnetically-eraseable memory may be subjected to a sufficiently powerful magnetic field to erase it.

A security apparatus of the biometric trait capture device can be formed or configured so as to carry out one or more security measures (protocol(s)) if it is determined that the memory no longer contains the stored value.

Biometric trait capture devices according to the present teachings are more secure, because they are protected against a possible tampering if left unattended. An operator of such a biometric trait capture device can thus be certain that any tampering with the device can also be automatically detected in case the device is left unattended.

According to a further aspect of the present teachings, a computer system can include a data processing device such as a computer terminal, which is configured to communicate with a biometric trait capture device according to any preceding or subsequent embodiment. The system can comprise one or multiple biometric trait capture devices, which are configured to be able to communicate with the data processing device. According to this aspect of the present teachings, the security measure, which is carried out if an opening of the housing of the biometric trait capture device is detected or sensed, may also include transmitting an appropriate message to the data processing device. In this case, the computer terminal will indicate or display that the biometric trait capture device has possibly been tampered with.

The data processing device may also forward a notification, i.e. that the biometric trait capture device was possibly tampered with, to a central location such as a server or the like that is accessible by the operator and/or by the manufacturer. In this way, even systems that include a plurality of discrete (spatially-separated) biometric trait capture devices can be easily managed and their security ensured.

Further objects, embodiments, advantages and designs of the present teachings will be explained in the following, or will become apparent, with the assistance of the exemplary embodiments and the appended Figure.

BRIEF DESCRIPTION OF THE DRAWINGS

FIG. 1 schematically shows an exemplary embodiment of a computer system having a data processing device and a signature capture device according to the present teachings.

DETAILED DESCRIPTION OF THE INVENTION

Figure 2A:
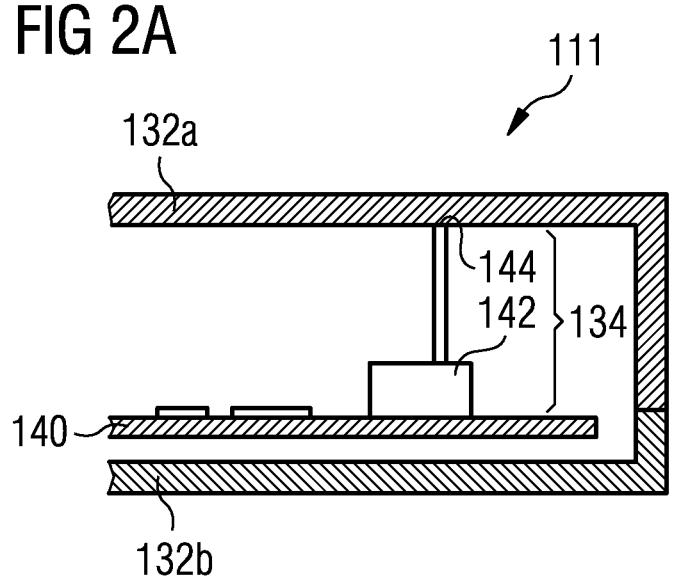
FIG. 2A shows a first partial section through the signature device shown in FIG. 1 in a closed state.

FIG. 1 schematically shows an exemplary embodiment of a representative computer system according to one aspect of the present teachings. The computer system basically comprises a signature (capture) device 111 connected for bidirectional communication with a data processing device 109, e.g., via a cable 104. In the alternative, however, the two devices 109 and 111 can also be configured to communicate with each other in other ways, for example via a wireless connection, e.g. via Bluetooth®, Wi-Fi® (any one of the IEEE 802.11 standards) or another communication interface such as for example infrared. The signature (capture) device 111 of the exemplary embodiment is capable of capturing, detecting or acquiring a handwritten signature, as well as optionally one or more other biometric traits, of the signor (the natural person who has signed on the touch screen as will be further described below) in order to generate an electronic signature. However, it should be understood that, in other aspects of the present teachings, the biometric trait capture device need not capture a handwritten signature and instead, an electronic signature may be generated based only on one or more other captured biometric trait(s) (data).

The data processing device 109 comprises a monitor 101, on which for example the electronic document 100 to be electronically signed can be displayed. The monitor 101 is connected to the computer 102, which can be operated, for example, using a keyboard 103. The computer 102 may be a general purpose computer that is programmed to perform the functions and algorithms disclosed herein or may be a special purpose computer specifically designed to implement the present teachings. In either case, the computer 102 preferably comprises at least one processor, e.g., a microprocessor, memory and/or storage, I/O device(s), a power supply, etc.

The signature device 111 preferably comprises a housing 132 having a cut-out or opening provided for a display 113. For example, a natural person can render or execute his or her handwritten signature 114 on the display 113 and the signature 114 is electronically captured by sensors disposed in the signature device 111. The capture of the signature 114 can also include, for example, biometric traits of the signature, such as for example the pressure and time elapsed (e.g., a signing rhythm), etc.

A checksum 115 can be calculated and also optionally displayed on the display 113. A data communication apparatus 116 in the signature device 111 enables the bidirectional communication with the data processing device 109 via the cable 104.

An encryption apparatus 117 is schematically represented in FIG. 1. The encryption apparatus 117 is preferably configured to execute an encryption method using one or more unique keys 107 stored in the signature device 111. The encryption apparatus 117 can further be configured to decrypt the generated biometric dataset using a signature-capture-process random value 106. In addition, the encryption apparatus 117 can be configured to encrypt the generated signature-capture-process random value 106 in the signature device 111 using the checksum 115. The encryption apparatus 117 can also be configured to encrypt the signature-capture-process random value 106, which is encrypted using the checksum 115, by using the key 107 stored in the signature device 111.

Further, a capture apparatus 118 optionally can be configured to capture at least one other biometric trait of the person, who will sign the electronic dataset, and to generate an electronic biometric dataset from the trait(s) thus captured. As was discussed in the Background section above, the contents of which are fully incorporated into the present section, the other biometric traits/data, which optionally may be captured at this time, include e.g., an iris scan, a fingerprint, a palm print, etc. Such additional biometric traits/data also may be incorporated into the electronic signature.

A memory 112 that is not readable from outside the signature device 111 is provided, in which for example the unique key 107 or another value can be stored. Other temporarily or permanently available data or keys 122, 123 can also be stored in this memory 112. The memory 112 can be a volatile memory such as a RAM, e.g. an SRAM, a DRAM, or an SDRAM, or a nonvolatile memory such as a ROM or a flash memory. Other types of memory, such as for example ferroelectric memory, magnetic memory and the like also may be utilized with certain aspects of the present teachings, as will be further described below.

The signature device 111 further includes an autonomous or self-contained power supply 130, for example a conventional battery. In case the memory 112 is a volatile memory, the battery supplies current to power the memory 112, so that the data stored in the memory 112 will be maintained even if externally-supplied power to the signature device 111 is interrupted. In addition or in the alternative thereto, the autonomous power supply 130 can supply current to one or more other components of the signature device 111, for example to a control unit 110 or the like. The control unit 110 may comprise, e.g., one or more processors, e.g., one or more microprocessor(s) programmed to execute operating software to perform the various functions and algorithms disclosed herein.

An interruption apparatus 134 is also provided and configured in the present embodiment to electronically disconnect the power supply 130 from the memory 112 and/or another component(s) of the signature device 111, if the housing 132 of the signature device 111 is opened. This representative, non-limiting interruption apparatus 134 will be now described in more detail with reference to FIGS. 2A and 2B.

Figure 2B:
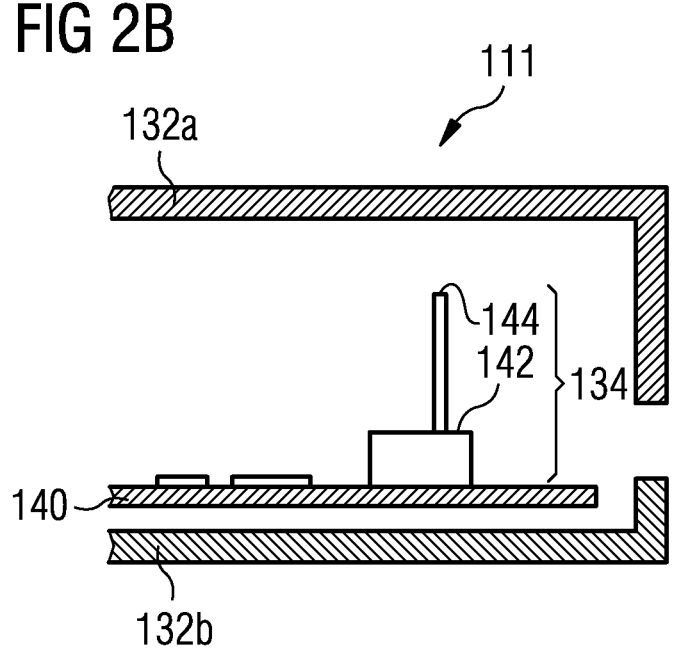
FIG. 2B shows a second partial section through the signature device shown in FIG. 1 in an opened state.

FIGS. 2A and 2B show a partial sectional view of the signature device 111 in a closed state and in an opened state, respectively. As is evident from FIGS. 2A and 2B, the housing 132 comprises an upper housing part 132a and a lower housing part 132b, which are connected to each other in the closed state of the housing 132, so that the housing interior is not accessible from outside the housing 132.

The various components of the signature device 112 are disposed in the interior of the housing 132. For example, at least some of these components can be disposed on a circuit board 140. In the illustrated example, the interruption apparatus 134 comprises a pushbutton switch 134, which includes a pushbutton-switch housing 142 and a movable mechanical actuating element (e.g., a pin) 144 protruding from the pushbutton-switch housing 142.

With the housing 132 closed as shown in FIG. 2A, the actuating element 144 is pressed by the upper housing part 132a into the pushbutton housing 142, so that the switch 134 is closed. A power supply circuit of the signature device 111 is designed such that, when the pushbutton switch 132 is closed, the memory 112 and/or other components of the signature device 111 are supplied with current by the autonomous power supply 130, regardless of whether the signature device 111 is in operation or not. For example, current is continuously supplied to the memory 112, even if the signature device 111 is not turned ON (i.e. the signature device 111 is electrically disconnected from a mains power supply). In this way it is ensured that the information stored in the memory 112, in particular the unique key 107 or another value stored in the signature device 111, are continuously maintained.

If the housing 132 were to be opened as shown in FIG. 2B, the upper housing part 132a becomes separated from the lower housing part 132b, and the actuating element 144 is no longer pressed into the pushbutton switch housing 142. Consequently, the actuating element 144 moves out of the pushbutton switch housing 142, thereby opening the switch 134 and thus automatically interrupting, i.e. disconnecting, the current (power) supplied by the power supply 130 to the memory 112.

In case a volatile memory 112 is utilized and is supplied with current (power) from the power supply 130, the interruption apparatus 134 and the power supply 130 can thus form or define a memory-erasure apparatus, since the volatile memory 112, and thus the key or value 107 stored therein, will be automatically erased upon an interruption of the power supply.

In the alternative, however, a separate memory-erasure apparatus 130 can also be provided in the signature device 111 as shown in FIG. 1 and can be configured to actively erase or overwrite the memory 112, e.g., when the power for the memory 112 and/or another component of the signature unit 111 from the power supply 130 is interrupted or disconnected and/or e.g., when an opening of the housing 132 is sensed by a sensor 134. For example, a bit or flag may be set in the control unit 110 (e.g., a memory thereof) of the signature device 111 and can be changed upon an interruption of the power in such a way that the interruption of the power can be determined based on this changed bit or flag. In such an embodiment, the control unit 110 or a processor of the signature device 111 can subsequently actively erase or overwrite the memory 112, for example when the signature device 111 is put into operation again.

Referring again to FIG. 1, the signature device 111 also includes a security apparatus 136, which is configured to carry out at least one security measure or protocol if it is determined that the memory 112 no longer contains the value 107. The security apparatus 136 can be provided as a separate control unit, or it can be implemented as part of a (main) processor (e.g., in the control unit 110) of the signature device 111.

The security apparatus 136 can carry out various security measures, individually or in combination. The security apparatus 136 can, for example, in a first security level, transmit a silent alarm to the operating software or the processor(s) (e.g., the control unit 110) of the signature device 111. The operating software can then evaluate this alarm or, depending on the setting, also ignore it. Further, in case an opening of the housing 132 is detected or sensed, i.e., if it is determined that the value (e.g., key) 107 is no longer stored in the memory 112, the security apparatus 136 can prevent the start of a signature capture using the signature device 111, or immediately after the signature device 111 is put into operation can show a message on the display 113 that an error has occurred or that a possible tampering has been detected. The security apparatus 136 can be configured such that the security levels can be increased or elevated in the sequence: a) silent alarm, b) prevent further signature capture, and c) display an error message to an administrator. It can also be provided that a reduction of the security level from a higher level to a lower level is not allowed, and that the security level can be reset only after manufacturer-authorized service of the signature device 111 has been performed.

It should be noted that, in case a unique key 107 is stored in the memory 112 and the unique key 107 is required for encryption, the encryption process can no longer be carried out by the signature device 111 after the erasure or altering of the unique key 107. For example, an appropriate error message can automatically be displayed, which indicates that a possible tampering has been detected, and/or further capture of data using the signature device 111 can automatically be prevented.

A first exemplary embodiment of a method for detecting an unauthorized opening of a signature device 111 is described below, which method can be carried out, e.g., using the signature device 111 shown in FIG. 1.

The signature device 111, which for example can be located at a fixed location of use, can for example be initially not in operation, i.e. turned off. In this state, the autonomous power supply 130, such as a conventional battery, powers the memory 112, which in this exemplary example is a volatile memory, so that the value (e.g., a unique key) 107 stored in the memory 112 remains continuously available, i.e. the value is continuously refreshed in the volatile memory 112.

In an attempt to manipulate or tamper with the signature device 111, an unauthorized person may try to open the housing 132 of the signature device 111, in order to gain access to the components in the interior of the housing 132. If however the housing 132 is now opened as shown for example in FIG. 2B, the switch 134 opens and interrupts the current (power) from the power supply 130 to the volatile memory 112. All information that is stored in the memory 112 is thereby automatically lost, and the unique key 107 or a corresponding value previously stored in the memory 112 is erased. Regardless of whether the signature device 111 has been tampered with, once the housing 132 is closed again, the unique key or value 107 is no longer stored in the memory 112.

If the signature device 111 is subsequently put into operation (i.e. it is turned on again) in order to, e.g., capture a signature of a user (signor), a query can be carried out as to whether the key 107 or another value stored in the memory 112 is identical to a key or reference value that is for example permanently stored in the signature device 111. For example, this key or reference value can be stored or contained in the firmware of a (main) processor (e.g., in the control unit 110) of the signature device 111. However, due to the previous opening of the housing 132, the two values are no longer identical. Therefore, in response to such a determination (comparison), the security apparatus 136 can carry out one of the above-described security measures or procedures, so that a possible misuse of a captured signature can be ruled out or prevented.

In a further embodiment, a non-volatile memory 112 can be provided in the signature device 111. In this case, upon opening the housing of the signature device 111, current (power) to another component(s) of the signature device 111, e.g., the control unit 110 or the like, is interrupted or stopped. An internal memory of the control unit 110 could thereby be actively erased, altered or overwritten (re-written), so that it can be determined that the housing 132 has been opened by simply checking a flag, a bit or another value set in the internal memory using the security apparatus 136. The security apparatus 136 could then control the memory-erasure apparatus 138, which for example could be formed as a part of the main processor or as a part of another control unit of the signature device 111, such that the memory-erasure apparatus 138 actively erases, alters or overwrites the memory 112. This erasure can occur as soon as the housing 132 is closed again, resulting in that the power from the power supply 130 is restored, or subsequent to a later startup of the signature device 111.

A representative, non-limiting algorithm for implementing this exemplary embodiment of the present teachings is as follows:

sensing an opening of the housing of the signature device, e.g., using a sensor as described above or below, and generating a signal in response thereto, communicating the signal to a processor, using the processor to address the location within the non-volatile memory storing the relevant value, e.g., the encryption key, and to overwrite or re-write that memory location with another value (e.g., all zeros or all ones).

However, it should be understood that various other algorithms for implementing this exemplary embodiment of the present teachings will be readily understood by a person of ordinary skill in the art based upon the disclosure provided above and below, and thus need not be further elaborated herein.

The consequence of such an erasure or altering of the stored value is that, when a verification (comparison) of the key or stored value 107 is subsequently checked or performed, it will be determined that the key or stored value 107 does not match the permanently stored value. This determination may be used to initiate one or more of the above-described security measures. In case the signature device requires the key 107 for encryption, it can be ensured that further operation of the possibly-tampered-with signature device is no longer possible until the signature device 111 subsequently undergoes appropriate service or maintenance.

In another embodiment, the opening of the housing 132 could be detected in a different way, i.e. other than by the result of the interruption of power from an autonomous power supply 130. For example, another type of sensor may be utilized, as will be further discussed below. In this case the memory 112 can be a non-volatile memory, and the autonomous power supply 130 can be eliminated. For example, a magnetic mechanism could be provided, which upon an opening of the housing 132 for example would bring a magnet in contact or proximity with a magnetic memory 112, thereby causing the stored value 107 to be erased. In the alternative, an electric pulse could be generated by an electromechanical mechanism as a result of an unauthorized opening. This electric pulse could then also be used to erase or overwrite the stored value 107 in the memory 112. In the alternative, the sensed signal may be communicated to a processor that then causes the location in the non-volatile memory containing the stored value (encryption key) 107 to be overwritten with another value.

In any of the above- or below-described embodiments, the check of whether the value 107 stored in the memory 112 is identical with the permanently stored value can be performed when the signature device 111 is put into operation (i.e. turned or powered on) and/or at regular intervals during operation of the signature device 111. In this way any tampering or unauthorized manipulation of the signature device 111 during its operation can also be reliably detected.

In other embodiments, the data communication apparatus 116 of the signature device 111 could additionally or alternatively be configured such that it transmits the information that an attempt to tamper with the data processing device 109 has taken place (has been detected). In this way, in case the data processing device 109 is connected with multiple signature devices 111, it is possible to detect any tampering with a particular signature device 111 from among a plurality of devices 111. In certain embodiments the data processing device 109 may be configured to further transmit this information to a central location such as a server or the like.

The above-described methods advantageously provide the assurance that no tampering has taken place with a signature device 111 before a signature of a user is captured therewith. In particular, such a signature device 111 may be used at a fixed location, for example at a bank counter or in a branch of an insurance company, without providing constant human monitoring to ensure that no unauthorized person has access to the signature device 111, thereby increasing the security of the device 111 without increasing labor costs.

Advantageously, an internal battery, which functions as power supply 130 to supply current (power) to a volatile memory, can be designed to last for several years. Under certain circumstances, the volatile memory 112 can thus be supplied with power over the entire operating life of the signature device 111. If the operating life of the signature device 111 is expected to exceed the operating life of the battery, the battery can be replaced by a manufacturer, wherein as part of this refurbishment the signature device 111 is also tested to determine its integrity, and the security level can be reset if necessary.

In the above-described preferred embodiment, the push-button switch 134 serves, in effect and function, as a proximity sensing device that senses whether the two halves 132a, 132b of the housing 132 are no longer in proximity, i.e. they are no longer in the housing closed state. However, the proximity sensing device may be implemented in a variety of ways in accordance with the present teachings, such as another type of mechanical contact (e.g., a breakable contact or fuse), a pressure sensor, a magnet (and magnet sensor, such as a reed switch or a Hall sensor), an electrical resistance or capacitive sensor, etc.

In each case, the proximity sensing device may either generate a signal that is communicated to a control unit (e.g., a processor) to cause the value stored in the memory to be erased or overwritten or may be disposed within a current flow path coupled to a volatile memory storing the value, such that a change of state in the proximity sensing device causes the current supply to the volatile memory to be interrupted or stopped. The skilled person will understand that a variety of designs are possible in this regard and the present teachings are not particularly limited to the mentioned designs.

It should also be understood that one or more process steps of any one disclosed exemplary embodiment of the present teachings can also be combined with one or more process steps of another disclosed exemplary embodiment of the present teachings, whereby further exemplary embodiments of the present teachings are disclosed thereby to persons of ordinary skill in the art. Of course, the same applies to one or more characteristics, structures, features, properties and/or functions of the disclosed exemplary embodiments of a signature device or of a computer system.

Additional, non-limiting aspects of the present teachings are as follows:

1. A method for detecting an unauthorized opening of a signature device (111), comprising:

providing a signature device (111) having a housing (132) and a memory (112) that is not accessible from outside the housing (132), in which memory (112) a value (107) is stored, and erasing the value (107) stored in the memory (112), if the housing (132) of the signature device (111) is opened.

2. The method according to aspect 1, wherein the stored value (107) is a unique key associated with the signature device (111).

3. The method according to aspect 1 or 2, wherein the signature device (111) comprises an autonomous power supply (130), which is built into the signature device (111) and supplies at least one component of the signature device (111) with power, wherein the erasing step includes the interrupting the supply of current from the power supply (130) to the at least one component upon an opening of the housing (132).

4. The method according to aspect 3, wherein the erasure of the value (107) stored in the memory (112) occurs automatically due to the type of the memory (112) if the power from the power supply (130) to the memory (112) is interrupted, or wherein the value (107) is actively erased as a consequence of a determination step that determines that the power from the power supply was interrupted.

5. The method according to any one of aspects 1 to 4, further including responding with a security measure if the memory (112) no longer contains the previously-stored value (107).

6. The method according to aspect 5, wherein the security measure includes:

providing a notification of the absence of the previously-stored value (107) to an operating software of the signature device (111), the receipt of which notification causes a security routine to be started, and/or preventing the capture of a signature by the signature device (111), and/or displaying a message on the signature device (111) that indicates the possible unauthorized opening of the signature device (111).

7. The method according to any one of the preceding aspects, wherein upon starting up the signature device (111) and/or at regular intervals during operation of the signature device (111) a check is carried out to determine whether the value (107) stored in the memory (112) is identical to a value permanently stored in the signature device (111).

8. A signature device (111) comprising:
a housing (132),
a capture apparatus (118) built into the housing (132) and configured to capture biometric data in digitized form,
a memory (112) that is not accessible from outside the housing (132), in which a value (107) is stored, and
a memory erasure apparatus (130, 134; 138) configured to erase the value (107) stored in the memory (112) if the housing (132) is opened.

9. The signature device according to aspect 8, wherein the stored value (107) is a unique key associated with the signature device (111).

10. The signature device according to aspect 8 or 9, further comprising:
an autonomous power supply (130) built into the signature device (111) and configured to supply current to at least one component of the signature device (111), and
an interruption apparatus (134) configured to interrupt the supply of current from the power supply (130) to the at least one component if the housing (132) is opened.

11. The signature device according to aspect 10, wherein the memory is a volatile memory (112), which is powered by the power supply (130), such that if the power to the memory (112) is interrupted, erasure of the memory (112) automatically occurs.

12. The signature device according to any one of aspects 8 to 11, further comprising:
a security apparatus (136) configured to carry out a security measure if the memory (112) no longer contains the previously-stored value (107).

13. The signature device according to aspect 12, wherein the security measure includes:
notification of the absence of the previously-stored value (107) to an operating software of the signature device (111), the receipt of which notification causes a security routine to be started, and/or
prevention of the capture of a signature by the signature device (111), and/or
display of a message on the signature device (111) that indicates the possible unauthorized opening of the signature device (111).

14. The signature device according to any one of aspects 8 to 13, further comprising:
a data communication apparatus (116) configured to execute bidirectional data communication with a separate data processing device (109), wherein the security apparatus (136) is configured to transmit, as a security measure, a message to the data processing device (109) that the memory (112) no longer contains the previously-stored value (107).

15. A computer system comprising:
a data processing device (109) configured to bidirectionally communicate with a signature device (111), and the signature device (111) according to any one of aspects 1-14, which is spatially separated from the data processing device (109).

16. A method comprising:
sensing an opening of a housing of a biometric trait capture device comprising a capture apparatus contained the housing and configured to capture biometric data, e.g., a handwritten signature and/or other biometric trait(s), in digitized form, and
in response to sensing the opening of the housing, erasing or overwriting a value stored in a memory of the biometric trait capture device that is not accessible from outside the housing.

17. The method according to aspect 16, wherein the value stored in the memory is a unique encryption key associated with the signature capture device.

18. The method according to aspect 16 or 17, wherein the biometric trait capture device comprises an autonomous power supply, which is built into or contained within the biometric trait capture device and supplies current to at least one component of the biometric trait capture device, and
the value erasing or overwriting step includes interrupting the supply of current from the autonomous power supply to the at least one component in response to the sensing of the opening of the housing.

19. The method according to any one of aspects 16-19, wherein:
the memory storing the value is volatile memory,
the at least one component is the volatile memory, and
the value stored in the volatile memory is automatically erased when current to the volatile memory is interrupted.

20. The method according to any one of aspects 16-19, wherein:
the memory storing the value is non-volatile memory, and
the method further comprises:
determining whether the current supplied to the at least one component has been interrupted and
in response to a determination that the current has been interrupted, actively erasing or overwriting the value stored in the non-volatile memory.

21. The method according to any one of aspects 16-20, further comprising:
checking the memory to determine whether the value is still stored in the memory, and if the memory no longer contains the value, executing at least one security measure.

22. The method according to aspect 21, wherein the at least one security measure includes:
providing a notification of the value no longer being stored in the memory to operating software of the biometric trait capture device, the receipt of which notification causes a security routine to be started, and/or
preventing further capture of biometric traits (data) by the biometric trait capture device, and/or
displaying a message on the biometric trait capture device that indicates a possible unauthorized opening of the biometric trait capture device.

23. The method according to any one of aspects 16-22, further comprising:
upon starting up the biometric trait capture device and/or at regular intervals during operation of the biometric trait capture device, performing a check to determine whether the value stored in the memory is identical to a value permanently stored in a non-volatile memory of the biometric trait capture device.

24. The method according to aspect 23, further comprising executing at least one security measure, e.g., according to aspect 22, if the memory is determined to no longer contain (store) the value.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved biometric trait capture devices and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Finally, further teachings concerning biometric trait capture devices and methods of making and using the same are provided in U.S. Pat. No. 5,297,202 and U.S. publication numbers 2011/0179289, 2011/0185184 and 2011/0231666, the contents of which are incorporated by reference as if fully set forth herein.

The invention claimed is:

1. A biometric trait capture device comprising:
   a housing,
   a biometric trait capture sensor contained in the housing and configured to capture biometric data in digitized form,
   a memory that is not electronically accessible from outside of the housing, the memory being configured to store a value, the memory comprising a volatile memory requiring a current to maintain the stored value,
   a memory-erasure device configured to cause the value stored in the volatile memory to be erased in response to an opening of the housing, and
   an autonomous power supply contained in the housing and configured to supply the current to the volatile memory even if externally supplied power to the biometric trait capture device is interrupted,
   wherein the memory-erasure device comprises a mechanical switch switchable between an open state and a closed state, the switch being held in the closed state by a portion of the housing and changing to the open state in response to the opening of the housing, wherein the mechanical switch interrupts the current from the autonomous power supply to the volatile memory in the open state, and
   the volatile memory is configured such that the value stored in the volatile memory is automatically erased when the current to the volatile memory is interrupted.

2. The biometric trait capture device according to claim 1, wherein the mechanical switch has an actuator that is shiftable from a first position to a second position, the switch being open when the actuator is in the first position and closed when the actuator is in the second position, the housing being configured to hold the actuator in the second position when the housing is closed and to move the actuator to the first position or to allow the actuator to move to the first position when the housing is opened.

3. The biometric trait capture device according to 1, further comprising:
   a security apparatus configured to check whether the value is still stored in the memory and to execute at least one security measure if the value is no longer stored in the memory.

4. The biometric trait capture device according to claim 3, wherein the at least one security measure includes provision of a notification that the value is no longer being stored in the memory to operating software or a processor of the biometric trait capture device, the receipt of which notification causes a security routine to be started.

* * * * *